United States Patent [19]

Sedgewick

[11] Patent Number: 4,859,890

[45] Date of Patent: Aug. 22, 1989

[54] FLAT WINDINGS AND COIL FORMS

[76] Inventor: Richard D. Sedgewick, 100 Horne St., Dover, N.H. 03820

[21] Appl. No.: 141,704

[22] Filed: Jan. 7, 1988

[51] Int. Cl.$^4$ .......................... H02K 3/04; H01Q 1/16; B21F 45/00

[52] U.S. Cl. ...................................... 310/208; 29/596; 310/179; 242/50

[58] Field of Search ............... 242/50; 310/68 R, 208, 310/268, 42, 179, 259; 336/175, 179, 191; 343/742, 866, 867, 869, 871, 873; 140/92.1; 29/596

[56] References Cited

U.S. PATENT DOCUMENTS

| | | | |
|---|---|---|---|
| 1,372,850 | 3/1921 | Turney | 242/50 |
| 1,598,824 | 9/1926 | Klopsteg | 343/871 |
| 1,640,929 | 8/1927 | Farkouh | 343/871 |
| 1,755,530 | 4/1930 | Andrews | 343/867 |
| 2,292,182 | 8/1942 | Billiard | 343/866 |
| 3,431,638 | 3/1969 | Burr | 29/598 |
| 4,401,907 | 8/1983 | Nosawa | 29/596 |

FOREIGN PATENT DOCUMENTS

| | | | |
|---|---|---|---|
| 60302 | 12/1891 | Fed. Rep. of Germany | 242/50 |
| 3502284 | 7/1986 | Fed. Rep. of Germany | 310/268 |
| 271257 | 5/1927 | United Kingdom | 343/867 |
| 2092833 | 8/1982 | United Kingdom | 29/596 |

Primary Examiner—Patrick R. Salce
Assistant Examiner—D. L. Rebsch
Attorney, Agent, or Firm—Daniel H. Kane, Jr.

[57] ABSTRACT

A coil form bobbin (20) for winding coil winding wire is a flat disk (22) formed with a plurality of peripheral radial slots (24,25,26) comprising at least one set of n slots spaced around the periphery of the flat disk dividing the bobbin into a respective set of n segments. The slots extend from the outside perimeter part way the flat disk. A method for winding flat coil windings on the coil form bobbin is described. The coil winding is in flat configuration for rotor and stator applications. Each winding phase (44,45,46) of multiple turns of coil winding wire is wound in the configuration of a flat substantially regular polygon. The multiple turns of coil winding wire turn in the same direction for conducting electrical current in the same rotational direction around the phase. The multiple turns of coil winding wire lie substantially next to each other side-by-side in the flat array along the sides of the polygon and are formed with well defined similar, radially aligned angles stacked one outside the other at each of the apexes or nodes of the polygon.

18 Claims, 12 Drawing Sheets

FLAT WINDINGS AND COIL FORMS

Cross Reference to Related Patent

This application is related to U.S. Pat. No. 4,691,746 issued Sept. 8, 1987 for FLAT WINDINGS, COIL FORMS AND WINDING METHOD.

TECHNICAL FIELD

This invention relates to new coil windings, coil winding forms or bobbins, and winding methods useful for stator and rotor windings in dc motors, meters, and torquers, including brushless dc motors and moving coil dc motors. The coil windings are also applicable as sensor elements in electromagnetic sensing devices.

BACKGROUND ART

Devices for producing motion from electric current, including motors, meters, and torquers, generally contain a stationary member designated the "stator" and a moving member designated the "rotor". The stationary stator and the rotating rotor may be provided by permanent magnets, electromagnets, or coils of wire. The electromagnet is generally a coil of wire wound in association with a high permeability material, such as iron, so that current flowing in the coil produces magnetic flux in the permeable medium.

Coils wound without cores or other integral magnetic material and intended for use as rotors are referred to as moving coil rotors or devices. Such coil windings are characterized by low inertia and are useful in meters if the coils are constrained to make only a portion of a revolution or in motors if the coil windings rotate continuously. For motor applications with continuous rotation, brushes and commutation are provided for current flow into and out of the moving coil rotor.

Alternately, the coil windings may be stationary, forming a stator while a permanent magnet is used for the rotor. The stator coil windings are separately energized or excited according to any of the established methods to provide rotating or moving magnetic fields which in turn produce the desired motion of the rotor. In that event no brushes are necessary. In motors, such an arrangement is known as a brushless dc motor and is characterized by long life due to the absence of brushes.

In conventional drive motors the stator coil windings are separate coils, separately wound and arranged typically in a circular array or other geometrical configuration according to the number of phases and number of poles of the dc motor. The stator coil windings may include many separate coils to achieve the desired smoothness of motion for uniform drive applications. Similarly, many separate coils, separately wound, are also required for stepper motor applications according to the desired level of refinement or discrimination of the step motion to be achieved. The separate coils are sequentially or selectively excited and energized by switching or commutation electronics, for example, on a printed circuit (PC) board in which case the coils may be mounted on the PC board resulting in a three dimensional structure of substantial depth and considerable complexity.

In each of these applications the coil winding, whether rotor or stator, is positioned relative to the air gap of a magnetic circuit and it is a general objective in dc motor and meter design to minimize the air gap in order to maximize available magnetic flux. The conventional coil winding configurations, generally cylindrical three dimensional structures with substantial depth, limit the extent to which the air gap can be minimized. The conventional coil windings for rotors and stators in dc motors do not have compact configuration. Furthermore, conventional stator and rotor windings are not spatially compatible with PC board switching or commutation electronics or for embedding in a PC board.

OBJECTS OF THE INVENTION

Generally, the present invention provides a new coil winding form on which a multiphase, multipole stator or rotor coil structure can be wound to produce a variety of moving fields depending on the geometry of the stator or rotor structure and the sequence, direction, and level of excitation and commutation of the multiple phases, to achieve rotating or linear motion, either smooth or incremental. A primary object of the invention is to provide new coil winding configurations on the single coil winding form which are unitary self supporting coil structures. The unitary winding configuration and winding method of multiple phases permits simultaneous winding of multiple equivalent current loops in a desired geometry which replace the separate individual coils of conventional motors.

Thus, the present invention simplifies the complexity of present drive motors which require separate coils, separately wound for the stator or rotor. The coil winding structure of the present invention which provides equivalent current loops in a desired geometrical configuration or array may be selectively and sequentially energized or excited, for example, for smooth and uniform rotary motion for smooth drive and uniform motion dc motor applications such as disk drive motors. The coil winding structure may also be energized or excited, however, in an incremental mode for step motor applications such as variable reluctance stepper motors.

Another object of the invention is to provide a single coil form and winding scheme that can produce a variety of multiphase multipole coil winding structures with organized accumulation of copper and buildup of turns of wire that is essentially flat. Thus, the coil form permits accumulation of turns of wire in a flat winding configuration for producing rotating or moving magnetic fields in the constraints of a flat space. The flat unitary coil winding configuration according to the invention results in the plurality of equivalent current loops in a flat geometry which replaces the conventional arrangement of separate coils separately wound occupying space of greater depth.

A further object of the invention is to provide a coil winding form or bobbin and winding method suitable for automated winding and mechanized winding of the flat coil winding structures of the invention. A feature of the coil winding form or bobbin is that it can remain as an integral part of the winding structures without requiring excessive space and while maintaining the essentially flat configuration. Alternately, the coil winding form or bobbin may be removed leaving the flat self supporting coil structure. The flat coil winding configuration is suitable for embedding in the flat space constraints of a printed circuit board along with the switching and commutation electronics mounted on the PC board for selectively and sequentially exciting the multiple phases and equivalent current loops to produce rotating or moving magnetic fields. Another advantage of the flat configuration of the coil winding form and coil structure is that any air gaps in magnetic circuits with which the coil winding structure cooperates may be minimized.

DISCLOSURE OF THE INVENTION

In order to accomplish these results the invention provides a new method for winding coil winding wire by providing a coil form or bobbin in the configuration of a flat annular or solid disk formed with a plurality of peripheral radial slots comprising at least one set of an odd number of slots spaced around the periphery of the flat disk and dividing the bobbin into a respective set of an odd number of segments. The radial slots extend from the outside perimeter part way through the flat disk and are preferably formed with a slot width greater than one diameter and generally less than two diameters or not substantially greater than two diameters of the coil winding wire for orderly accumulation of wire as hereafter described.

The method contemplates winding a first turn of the coil winding wire, for example, down through the first slot of a first odd number set of slots and under the first segment of the respective set of odd number segments of the bobbin and up through the second slot of the first odd number set of slots and over the second segment of the bobbin. In the basic example of a flat disk with three slots spaced around the periphery of the disk, the coil winding wire is wound down through the third slot and under the third segment, returning up through the first to the point of beginning to complete the first turn before passing through the first slot in the opposite direction. More generally, where an odd number of slots greater than three is spaced around the periphery of the disk, for the first turn the coil winding wire is wound down through the odd number slots and under the odd number segments, and up through the even number slots and over the even number segments of the first odd number set around the coil winding form or bobbin to the first slot completing a first turn of coil winding wire around the bobbin. The coil winding wire is seated in the respective slots at the base of the slot during winding.

The further winding steps for the flat disk with three slots spaced around the periphery then include winding a second turn of the coil winding wire up through the first slot of the first odd number set of slots and over the first segment, down through the second slot and under the second segment, and up through the third slot and over the third segment returning down through the first slot at the beginning. More generally, where an odd number of slots greater than three is spaced around the periphery of the disk, during the second turn around the disk, the coil winding wire is wound up through the odd number slots and over the odd number segments and down through the even number slots and under the even number segments of the first odd number set around the flat disk to the starting first slot completing a second turn. The coil winding wire of the second turn is seated in the respective slots in adjacent contact with the first turn of coil winding wire laying flat across the respective segments of the bobbin between the slots on alternately opposite sides of the segments of the bobbin from the first turn. A feature and advantage of this arrangement is that the coil winding wire passes through the slots in alternately opposite directions accumulating in the slots in an orderly fashion to form flat polygonal coil winding configurations even if the width of the slots is greater than two coil winding wire diameters.

Additional turns of coil winding wire are wound around the bobbin with each odd number turn following the pattern of the first turn while each even number turn follows the pattern of the second turn. As a result, the coil winding wire from the odd turns lay side by side in a flat array on the same alternating sides of the respective segments of the bobbin with the even turns laying next to each other side by side in flat array on alternately opposite sides of the respective segments of the bobbin from the odd turns. A feature and advantage of this configuration and method is that a multipole first phase winding of a plurality of turns of coil winding wire is provided in a flat array having a thickness no greater than approximately the thickness of two diameters of the coil winding wire plus the thickness of the flat disk bobbin in between.

According to the invention a plurality of coil winding phases can be provided in the flat configuration by winding each successive phase according to the foregoing method but on a different set of odd number slots and respective set of segments of the bobbin and laying each consecutive phase with the respect flat array lying over the flat arrays of the previous phases and offset by the desired phase angle. In the preferred embodiment the flat disk bobbin is provided with a plurality of sets of three slots equally spaced around the disk and each phase of the flat coil winding is wound in the configuration of a flat equilateral triangle. Other flat polygonal configurations for the coil windings are also provided such as flat isosceles triangles and flat pentagons though the optimum radial component of current and axial magnetic field flux intensity is afforded by the equilateral triangular configuration.

The invention also contemplates flat polygonal coil configurations of polygons with an even number of sides and apexes wound on flat disk bobbins with even number sets of slots. According to this configuration and method the coil winding wire of all of the turns on the bobbin lay side by side in flat array on the same alternating sides of the segments of the respective set of even number segments of the bobbin between the even number slots. The turns of coil winding wire then cross through the slots of the first set of even number slots, one above the other in the same direction in contrast to the winding or coil winding wire on a bobbin with sets of odd number slots.

A feature and advantage of the invention is that the coil winding form or bobbin may comprise a variety of materials to achieve different beneficial results. For example, the flat annular disk bobbin may be composed of magnetically permeable material to provide a core or other integral permeable metal element such as "back iron" for a magnetic circuit in which the coil winding is inserted. The coil winding bobbin may of course also comprise lightweight dielectric, insulating or synthetic materials such as plastics, resins, wood and related products. A feature and advantage of the winding configurations and method of the invention is that the coil windings after orderly accumulation in the slots of the bobbin are self supporting and the bobbin may be eliminated or removed. For example, the bobbin may comprise a thermoplastic material which is melted away or a soluble material which is dissolved away leaving the flat configuration self supporting winding. Alternately, the bobbin may be comprised of moldable material with the turns of coil winding wire embedded in the moldable material during or following winding to minimize the thickness of the coil windings and bobbin. Another feature of the invention is that the flat coil winding configurations may be embedded directly in a printed circuit board with associated switching electronics and components, for example for a dc motor mounted with reference to the PC board.

While the invention may take a variety of configurations of both odd number sided flat polygons such as triangles and pentagons and even number sided flat polygons such as squares and hexagons, the preferred polygonal configuration of the invention is triangular providing the closest approach to radially directed currents and axial magnetic field components for interaction with adjacent magnetic elements either to drive the rotation of an adjacent rotor where the coil winding is a stationary stator or to rotate itself where the coil winding is a rotor in reaction to an adjacent stator. In either event the flat disk configuration of the coil winding and bobbin permits minimization and substantial elimination of the air gap in which the coil winding operates to a degree never before achieved or achievable by conventional stator and rotor configurations.

Other objects, features and advantages of the invention are set forth in the following specification and accompanying drawings.

DESCRIPTION OF PREFERRED EXAMPLE EMBODIMENTS AND BEST MODE OF THE INVENTION

Figure 1:
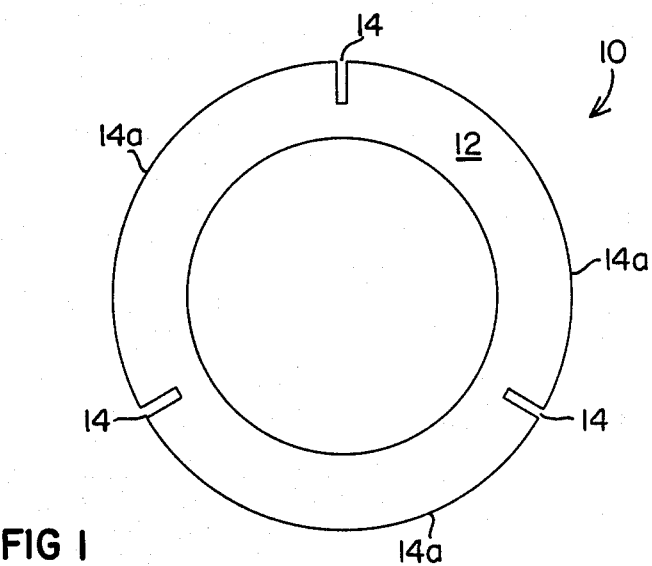
FIG. 1 is plan view of a flat annular disk coil winding form or bobbin according to the invention for winding a flat single phase multipole coil winding.

A flat coil winding form or bobbin 10 for winding a single phase flat coil winding according to the invention is illustrated in FIG. 1. The bobbin 10 is in the configuration of a flat annular disk 12 formed with one set of odd number slots 14 equally spaced around the periphery of the disk 12. In the preferred example three slots form the set of odd number slots for winding a single phase flat coil winding of equilateral triangular configuration as hereafter described. The slots divide the bobbin into a respective set of odd number segments 14a.

The slots 14 extend from the outside perimeter of the bobbin part way through the flat annular disk 12 and in this example extend more than half way and approximately ⅔ of the way through the flat ring or annulus. Furthermore, according to the invention the slots are formed with a width greater than one diameter and generally less than or not substantially greater than two diameters of the coil winding wire although the slots may be wider than this for odd number sets of slots in which successive turns of coil winding wire cross over each other in opposite directions through the slots. The coil winding wire may be solid single strand wire or multifilament or multistrand wire but in either event the prescribed slot width of greater than one diameter and generally less than two diameters or not substantially greater than two diameters provides for orderly accumulation of the wire during coil winding.

Figure 1A:
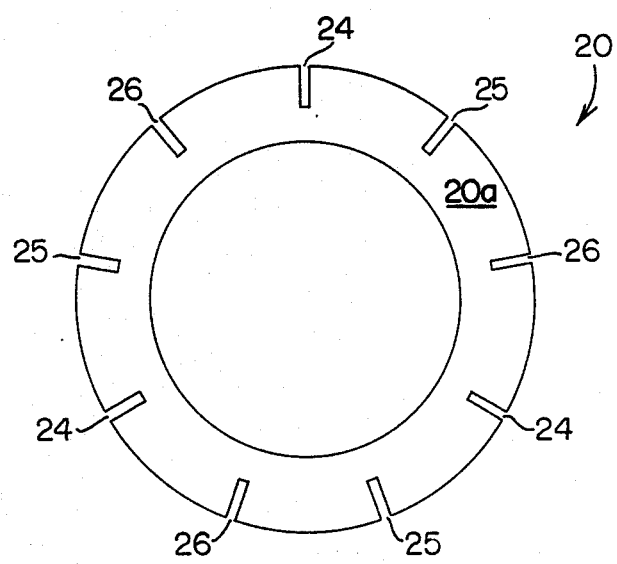
FIG. 1A is a plan view of a flat annular disk coil winding form or bobbin for winding a flat three phase multipole coil winding.

Another coil winding form or bobbin 20 for winding a flat coil winding with multiple phases is illustrated in FIG. 1A. The bobbin 20 is a flat annular disk 20a, in this example formed with three sets of odd number slots, 24, 25 and 26 equally spaced around the periphery of the disk. Each set consists of three slots equally spaced around the disk for winding a flat coil winding. The three phases of flat equilateral triangular configuration are offset from each other in rotational positions around the disk by equal angles. As in the example of FIG. 1 the slots extend from the outside perimeter of the bobbin part way and approximately ⅔ of the way through the flat annular disk 20a. The slots have a width greater than one diameter and generally less than two diameters or not substantially greater than two diameters of the coil winding wire for orderly accumulation of the wire during winding as hereafter described.

Figure 1B:
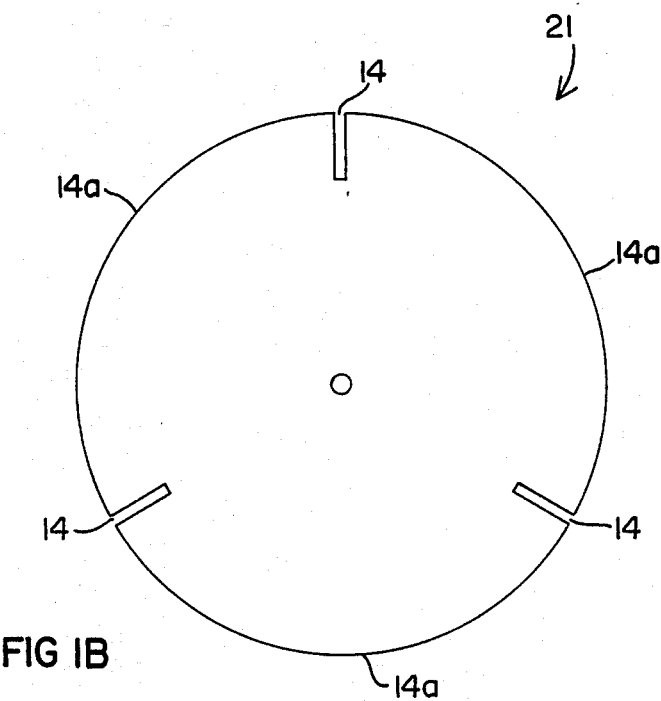
FIG. 1B is a plan view of a flat solid disk winding form or bobbin for winding a single phase coil structure according to the invention.
Figure 1C:
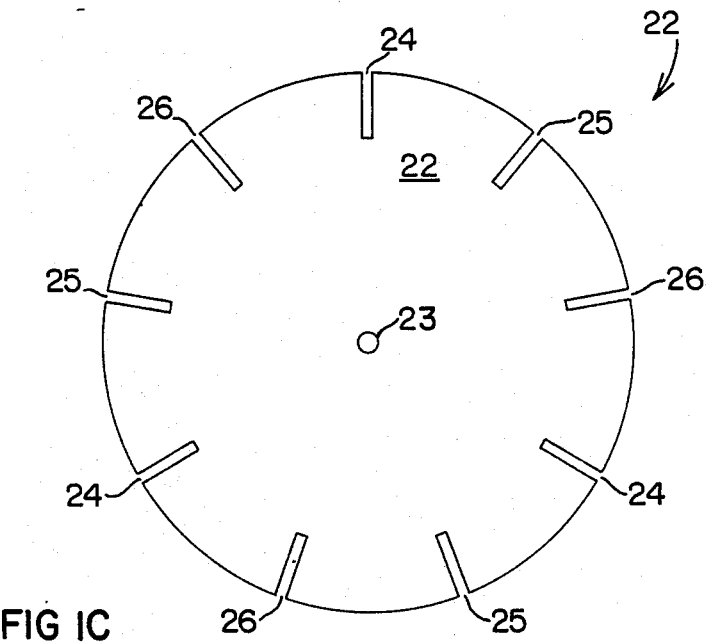
FIG. 1C is a flat solid disk coil winding form or bobbin for winding a three phase winding structure according to the invention.

It is also advantageous according to the invention to provide flat solid disk coil winding forms or bobbins as illustrated in FIGS. 1B and 1C. The solid disk coil forms 21 and 22 illustrated in FIGS. 1B and 1C perform the same function as the flat annular disk coil forms 10 and 20 illustrated in FIGS. 1 and 1A and the corresponding structural features are designated by the same reference numerals. Because the flat disk coil forms 21 and 22 are solid substantially to the center of the disk, however, they may be useful in other applications such as moving coils and rotors where the center of the disk 22, for example, is provided with a rotor axle or rotational axis 23. Furthermore, the solid disk 22 may be formed of a moldable or impressionable material so that the coil winding structure and its respective phases may be embedded, compressed or melted into the surface of the disk. The single phase coil winding form 21 may have applications in torquers and sensors. The flat disks may also be formed with spokes extending radially between the center and a continuous perimeter or with holes or cutouts of different configuration through the solid disk material.

Figure 2A:
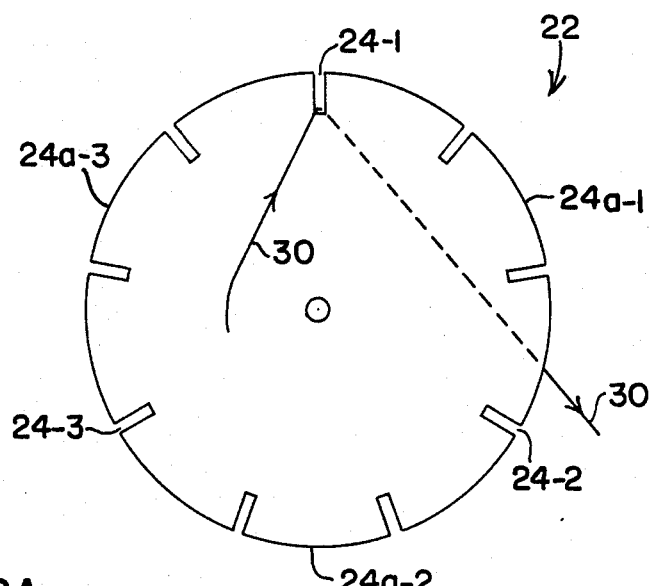
FIGS. 2A–2F are plan views of the flat bobbin of FIG. 1C with a partially wound single phase flat coil winding of triangular configuration showing sequential steps in the coil winding method.
Figure 2B:
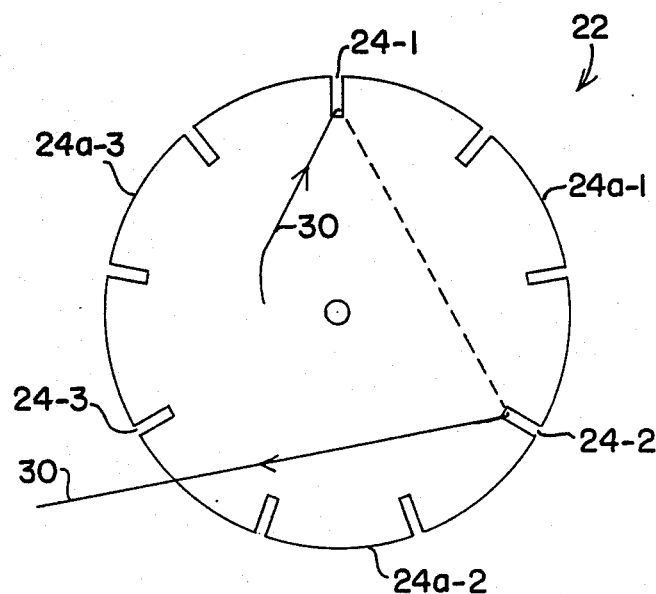
Figure 2C:
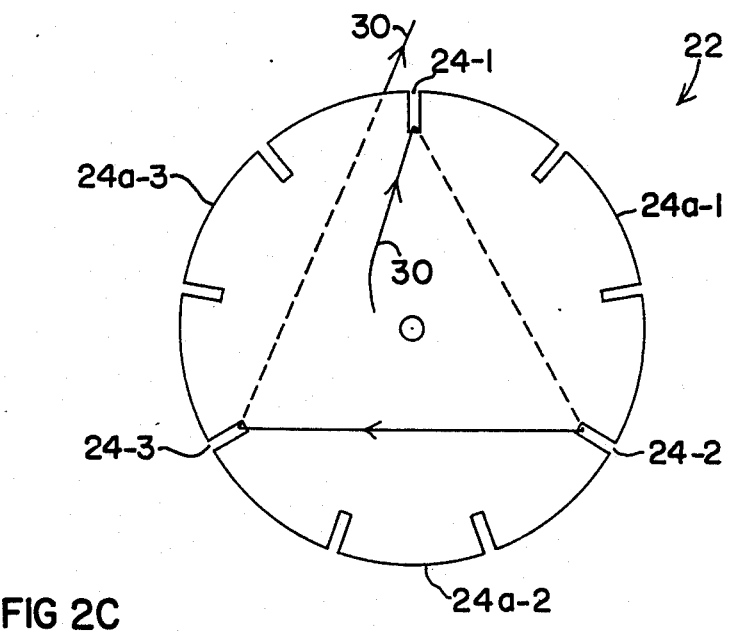
Figure 2D:
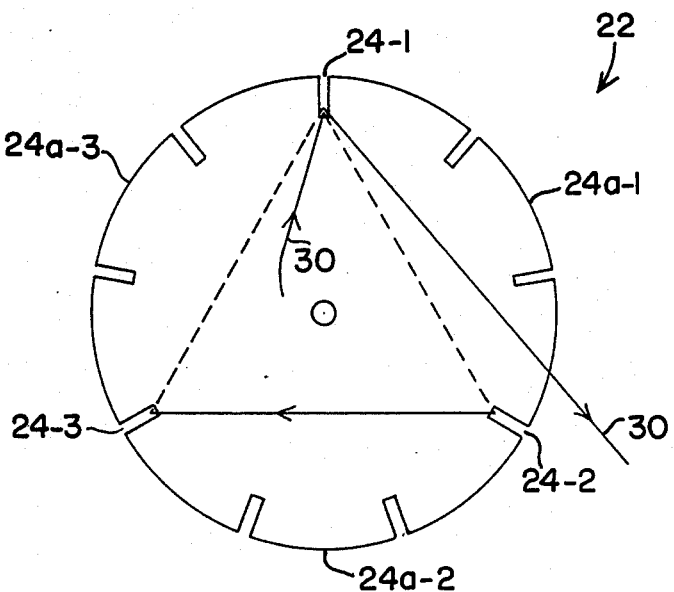

The winding of the first phase of a flat multiple multiphase coil winding using the bobbin 22 of FIG. 1C, according to the invention, is illustrated in FIGS. 2A-2F. The first phase consists of a coil winding of flat equilateral triangular configuration. The start of the first turn of wire to be wound in the first set of three slots 24 is shown in FIG. 2A. The coil winding wire 30 is shown going down through the first slot 24-1 of the first set of odd number slots 24 and winding under the first corresponding segment 24a-1 of the bobbin disk 22. As shown in FIG. 2B the coil winding wire 30 is then wound up through the second slot 24-2 of the first set of slots 24 and over the second respective segment 24a-2 of the disk 22. As shown in FIG. 2C the coil winding wire 30 is then wound down through the third slot 24-3 and under the third respective segment 24a-3 of the bobbin disk 22. As shown in FIG. 2D coil winding wire 30 then passes upward through the first slot 24-1 of the first set of slots 24 completing the first turn of wire and providing a full turn of wire around the bobbin 22.

After a first turn of wire through the set of slots 24 around the bobbin disk, the coil winding wire 30 then passes during the second turn or next turn through the slots 24 in opposite directions from the first turn. Thus, while the winding generally continues in the same winding direction around the bobbin, in this example in the clockwise direction, the coil winding wire for any particular turn passes through the slots in opposite directions from the previous turn. Thus, as shown in FIG. 2D following completion of one turn of the wire, coil winding wire 30 passes upward through the first slot 24-1 although the winding was initiated at the beginning of the first turn by passing downward through the first slot 24-1 as shown in FIG. 2A. This is attributable to the selection of odd number sets of slots according to the preferred embodiment of the invention.

Figure 2E:
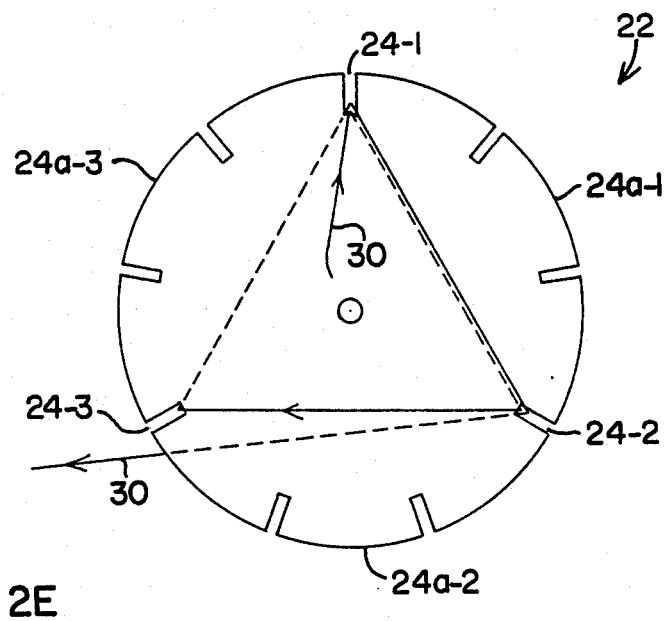

Continuing with the winding of the second or next turn of wire as shown in FIG. 2E, the coil winding wire 30 after passing upward through the first slot 24-1 and being seated adjacent to, over, and outside the previous turn of wire passes over the first respective segment 24a-1 of the annular disk 22 and then downward through the second slot 24-2 of the first set of slots 24. Continuing on through FIG. 2E the coil winding wire is then wound under the second respective segment 24a-2 of the bobbin disk 22, up through the third slot 24-3 and over the third respective segment 24a-3 of the bobbin disk 22. A full winding cycle of two turns of wire around the bobbin is then completed by winding the coil winding wire 30 down through the first slot 24-1 as previously illustrated in FIG. 2A. It is apparent that each coil winding cycle involves two turns of coil winding wire around the disk or bobbin.

Several features of the invention are apparent in the winding process described with reference to FIGS. 2A-2D. Because the width of the slots 24, according to the invention, is greater than one diameter and generally less than two diameters of the coil winding wire 30, the wire during each pass through a slot is constrained to lie above, outside or beyond the wire of the previous turn forming one acute apex of the flat polygonal coil at each slot of the set. In this preferred example the selection of three slots results in a flat equilateral triangle with a flat well defined apex developing at each slot and growing radially outwardly in each slot with each turn of the wire. Furthermore, because the slots 24 constrain each turn of wire and each pass of wire through the slot to be radially above or beyond or outside the previous turn, the turns of wire 30 lie side by side adjacent to each other in a flat array along the sides of the flat equilateral triangle.

Figure 2F:
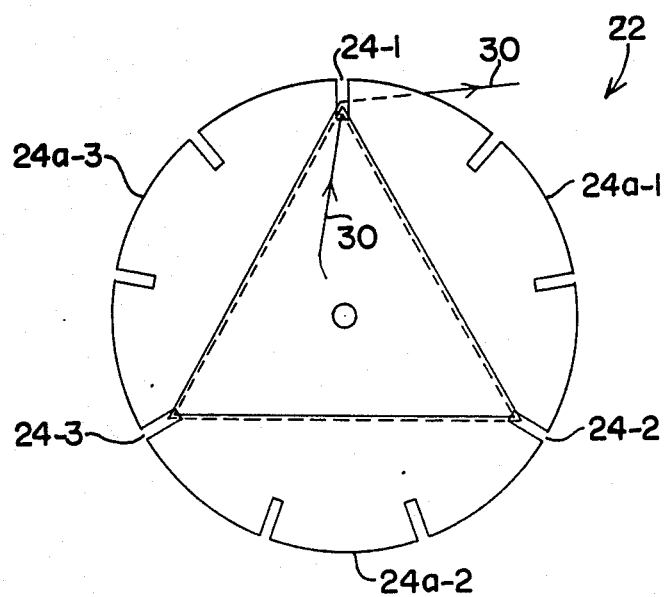
Figure 2G:
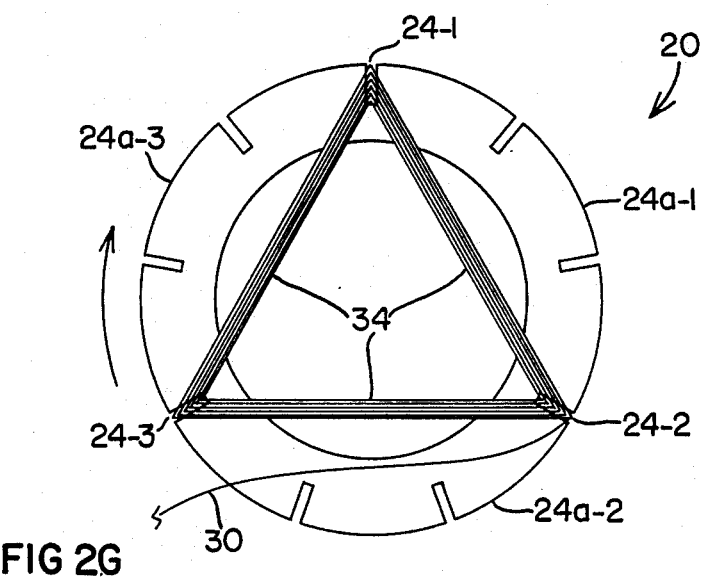
FIGS. 2G and 2H are plan views of the flat bobbin of FIG. 1A showing completion of a flat coil winding of triangular configuration with well defined apex at each slot.
Figure 2H:
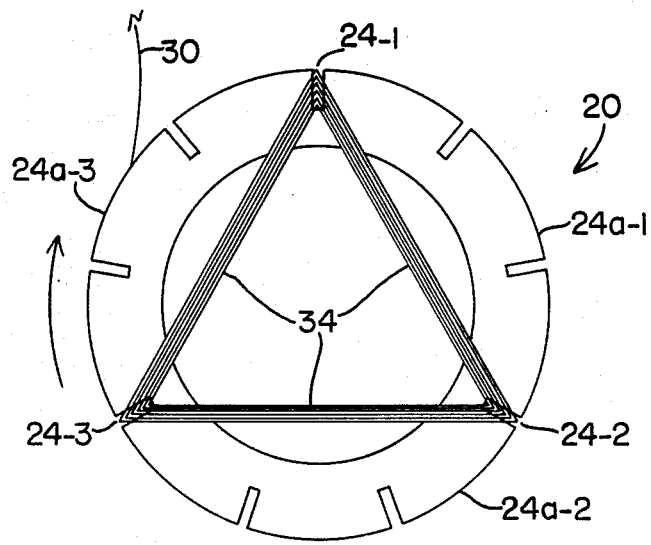

The completion of flat equilateral triangle coils on winding forms or bobbins 20 of the type shown in FIG. 1A is illustrated in FIGS. 2F and 2G. The full coils 34 are formed with well defined apexes in the respective slots 24-1, 24-2, and 24-3 of bobbin 20 and with flat sides over the segments 24a-1, 24a-2, and 24a-3.

After winding many cycles, the odd number turns lie adjacent to each other in a flat array on the same alternating sides of the respective segments of the bobbin disk, passing through the slots in the same direction. On the other hand, the even number turns of wire lie together adjacent to each other in a flat array on alternating sides of the respective segments opposite the odd number turns. The even number wires pass in the same directions through the slots but opposite to the directions of passage through the slots of the odd number turns of wire. The result is a very flat coil winding having a maximum thickness equal to the thickness of the bobbin disk, for example 1/16 inch or less (1.5 mm or less) plus the thickness of two diameters of the coil winding wire. As illustrated in the side view or edge view of FIG. 3 the bobbin disk 22 is shown with the last two turns 30a and 30b of the coil winding wire 30 visible on either side of the disk along with the identified slots in the disk.

Figure 4:
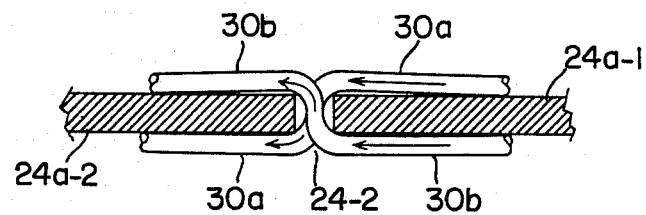
FIG. 4 is a detailed fragmentary side view at a slot of the bobbin showing the crossover of successive turns of wire turning in the same direction but passing through the slots in opposite directions as indicated by the arrows.

A detailed view of the passage of coil winding wire from adjacent turns through a slot in opposite directions is illustrated in FIG. 4. The first turn of coil winding wire 30a passes over the first segment 24a-1 down through the second slot 24-2 and under the second segment 24a-2. On the other hand the second turn 30b of coil winding wire being wound in the same clockwise direction passes under the first segment 24a-1 up through the second slot 24-2 and over the second segment 24a-2. The selection of the width for the slots such as slot 24-2, according to the invention, relative to the diameter of the coil winding wire provides for orderly seating and accumulation of wire in the slots to form the acute apexes of the flat polygonal coil winding phases.

Generally, for winding a particular coil winding phase around a disk formed with a set of odd number slots the invention contemplates during the first turn of a coil winding cycle of alternately winding the coil winding wire down through the odd number slots and under the odd number segments and up through the even number slots and over the even number segments completing a first turn of coil winding wire around the bobbin, seating the wire in the respective slots. During the second turn of the winding cycle the invention generally contemplates alternately winding the coil winding wire up through the odd number slots and over the odd number segments and down through the even number slots and under the even number segments to the starting first slot, seating the coil winding wire in the slots and completing a full cycle. The coil winding wire lies flat across the respective segments between slots with odd number turns side-by-side on one side and even number turns side-by-side on the other, with wire from adjacent turns passing in adjacent contact through the slots but in opposite directions.

Figure 3:
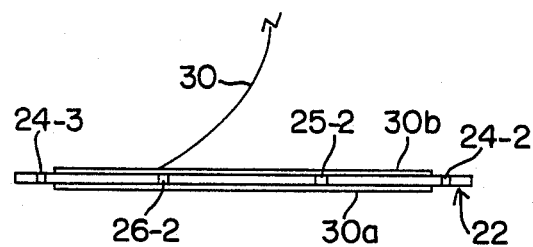
FIG. 3 is a side view looking at the edge of the flat bobbin and winding showing the two flat layers of the coil winding and the intermediate annular disk bobbin or form.

In other words, as it is shown in FIGS. 2–4, the flat winding is formed in the shape of a polygon and is composed of two layers lying in two parallel adjacent planes slightly spaced apart. The turns of the coil winding wire lie in alternately opposite planes between apexes crossing over between the two adjacent planes at the apexes of the polygon. In the case of a polygon with odd number apexes, the adjacent turn of wire cross over in alternately opposite directions. In the case of a polygon with even number of apexes as shown for example in FIG. 8, the adjacent turns of coil winding wire cross over at the apexes in the same direction. In each case the turns accumulate outwardly in the radial direction assuring that the flat coil winding is composed of two flat layers lying in two adjacent but slightly spaced apart planes.

The resulting polygon provides a multipole coil winding phase, the number of poles dependent upon the number of apexes of the selected polygon. The most important factor in selection of the polygon shape, however, is flux interaction of the flat coil winding with adjacent elements of a magnetic circuit in which it is positioned. The extent of flux interaction is affected by the shape of the selected polygon.

As the polygon shape approaches a circle, for example, from a triangle to a pentagon, etc. and the currents in the wires approach circular currents, less and less flux interaction occurs between the coil winding and adjacent iron or other magnetic circuit elements. On the other hand the greater the currents in the coil windings approach to radial currents, the greater the flux interaction. In this respect, the equilateral triangle of all of the regular polygons provides the closest approach to radial currents in the turns of coil winding wire with greater axially directed flux and axial flux paths for interaction with the axial flux paths of adjacent magnets and iron. As used in the foregoing description, "radial" refers to the radial directions or directions of radii of the flat bobbin disk coil form while axial refers to the axial direction or direction of the axis of the flat bobbin disk coil form.

Figure 5:
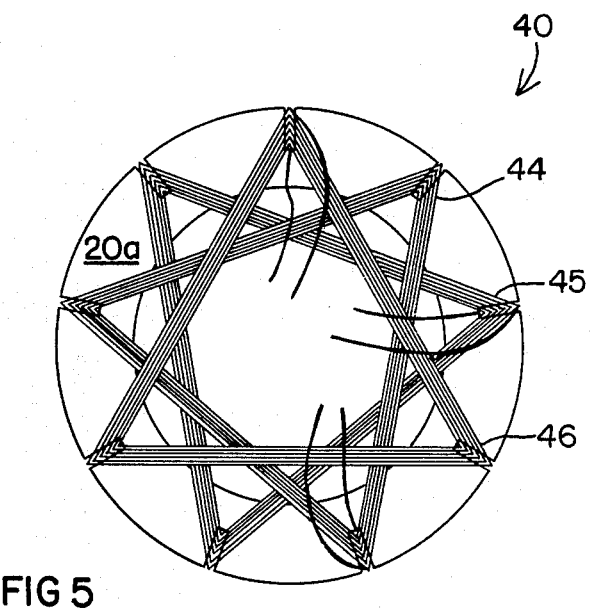
FIG. 5 is a plan view of a flat three phase multipole coil winding and bobbin according to the invention.

For the coil winding phases of flat equilateral triangular configuration, three slots are provided in each set of slots for each phase. A flat annular disk with three equally spaced slots, for example as illustrated in FIG. 1, accommodates a single phase three pole flat coil winding while six equally spaced slots accommodate winding of two phases. A flat annular disk with nine equally space slots, for example as illustrated in FIG. 1A, accommodates the winding of a three phase three pole flat coil winding 40 as illustrated in FIG. 5.

In the three phase three pole flat coil winding 40 of FIG. 5 each of the phases 44, 45 and 46 of flat equilateral triangular configuration is wound in the same manner as described with reference to FIGS. 2A–2F. The separate phases may be electrically coupled according to the application of the coil winding. For example, as a stator for a dc motor each of the phases may be separately electrically coupled to appropriate electronics for timed excitation and switching to produce rotating magnetic fields. In other applications the phases may be coupled in series. For rotor applications, the separate phases are coupled through brushes and slip rings to a commutator. As shown in FIG. 5 each of the phases is rotationally offset from each other by equal angles and overlie each other in a flat array. According to a feature and advantage of the invention, the flat annular disk configuration accommodates the overlying portions of the phases within the opening or hole of the annulus to accommodate the thicknesses of overlying layers while minimizing the overall thickness of the coil winding and bobbin assembly. Thus, the flat coil windings according to the present invention may be accommodated in minimum air gap applications in which the air gap between the magnet and back iron or other elements of a magnetic circuit are essentially eliminated.

While the winding form or bobbin according to the invention is typically made of lightweight dielectric material such as treated paper or board, resin, plastic, etc., the bobbin itself may comprise an iron or other permeable material element of the magnetic circuit in which the coil winding is applied and may comprise, for example, the back iron used in the magnetic circuit of a dc motor. Alternatively, the thickness of the coil winding may be further minimized by using a flat annular bobbin disk of molding material or of thermoplastic material for pressing, compressing or sinking the coil winding phase or phases into the material of the bobbin. For example, a thermoplastic bobbin may be subjected to heat and pressure after the coils have been wound in the manner described above. According to another alternative embodiment the flat annular disk or bobbin may be entirely removed leaving a self supporting flat coil winding. This is accomplished by forming the flat annular disk or other bobbin disk from dissolvable or meltable material or elements which may be disassembled and removed.

A feature and advantage of the coil winding method and bobbin of the present invention is that the coil windings are self supporting by reason of the coil configurations and apex configurations imposed by the constraints of the radial slots of the bobbin disk. The orderly accumulation of wire and adjacent folding of successive turns results in the self supporting structure.

Figure 6:
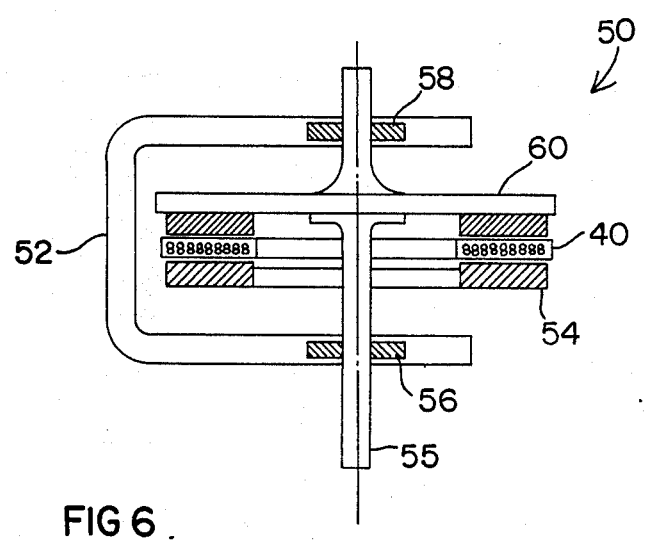
FIG. 6 is a diagrammatic side view of a brushless dc motor incorporating the flat coil winding as a stator.

An example application of the present invention in a brushless dc motor 50 is illustrated in FIG. 6. In this example, the flat coil winding and coil form or bobbin 40 of the type, for example illustrated in FIG. 5, is applied as a stator winding mounted in stationary position with reference to the motor base 52. Adjacent to the stator winding 40 is the back iron 54 providing one of the permeable elements of the magnetic circuit of the motor. Within the stator winding 40 and back iron 54 is mounted the rotor assembly shaft 55, mounted for rotation relative to the motor base 52 on bearings 56 and 58. A permanent magnet rotor assembly 60 is mounted on the rotor shaft 55 in position adjacent to the stator winding 40 on the side opposite the back iron 54. The multiple phases of the stator winding 40 are energized or excited sequentially by appropriate electronics to produce a rotating magnetic field which initiates and maintains rotary motion of the permanent magnet rotor assembly 60.

A feature of the flat coil winding and bobbin stator according to the invention is that the air gap between the stator winding 40 and back iron 54 is effectively eliminated while the air gap between the stator winding 40 and the permanent magnet rotor assembly 60 is reduced to the minimum necessary for relative motion between the stator and rotor. As a result, the magnetic circuit of the motor consists of essentially continuous permeable material for maximum magnetic flux intensity and for optimizing flux interaction between the stator and rotor. While the invention is described in FIG. 6 with reference to a brushless dc motor, the flat coil winding and bobbin assembly may also be applied as a rotor, for example in a moving coil motor, with brushes, slip rings and commutator while still optimizing the magnetic circuit of the motor and maximizing the flux intensity and flux interaction between the rotor and stator.

Figure 7:
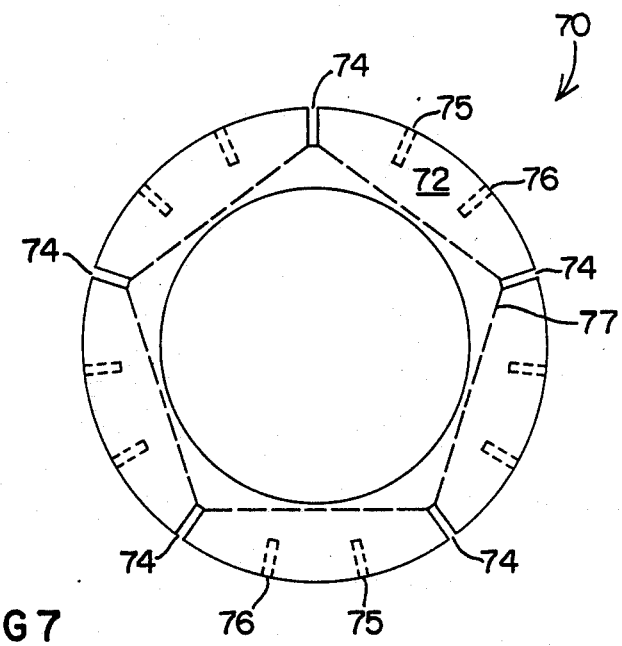
FIG. 7 is a plan view of a bobbin with sets of five slots for winding flat coil winding phases of pentagonal configuration.

A flat annular disk bobbin 70 for winding coil windings of flat pentagonal configuration is illustrated in FIG. 7. In this example the flat annular disk 72 is formed with one set of five peripheral radial slots 74 for winding a single phase flat coil winding element as heretofore described. The first turn 77 of such a single phase coil winding element is shown in dotted outline. For additional phases, for example, providing a total of three phases, additional sets of odd number slots 75 and 76, each five in number, may be formed in the bobbin disk 72 as shown in dotted outline.

While in the preferred form of the invention the coil winding form or bobbin according to the invention is provided with sets of odd number slots, flat coil windings may also be formed according to the invention on flat bobbin disks with sets of even number slots.

Figure 8:
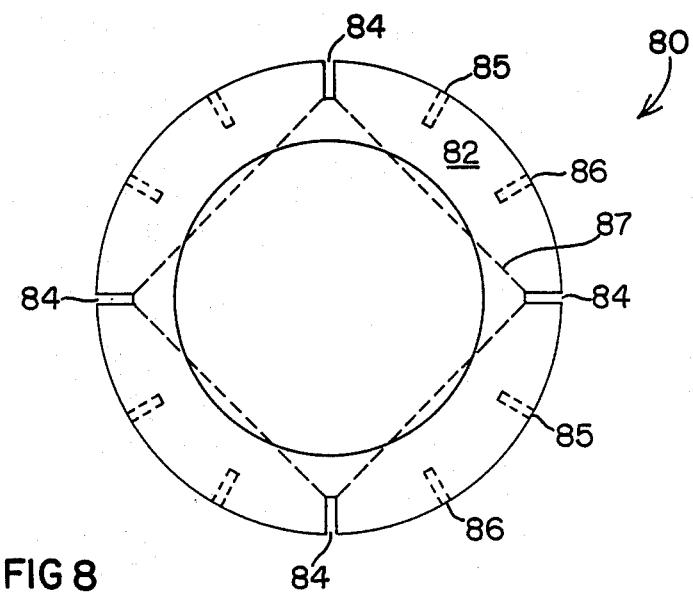
FIG. 8 is a plan view of a bobbin with even number sets of slots and a coil winding configuration of a polygon with an even number of sides.

In the example of FIG. 8 a coil winding form or bobbin 80 is provided by flat annular disk 82 formed with a set of four slots 84 equally spaced around the periphery of disk 84. The four slots 84 accommodate a coil winding according to the invention of flat rectangular or square configuration. In applying the method of the present invention to windings on bobbins with sets of one or more even number slots it becomes apparent that the coil winding wire always passes in the same direction through the same slot in winding successive turns and furthermore that the successive turns of coil winding wire lie on the same side of the same segment of the disk.

In other words, all of the turns of coil winding wire pass, for example, down through the odd number slots and under the odd number segments and up through the even number slots and over the even number segments, all of the turns of coil winding wire at the sides of the even sided polygon laying flat across the same sides of the respective segments. The result is a flat coil winding and bobbin assembly having a thickness substantially no greater than approximately one diameter of the coil winding wire plus the thickness of the flat annular disk adjacent to the winding. While such flat coil windings of even number sided polygonal configuration do not have the advantage of all of the self supporting characteristics of the coil windings of flat odd number sided polygonal configuration, nevertheless in cooperation with the bobbin they achieve all the other features and advantages of the invention. While the example of FIG. 8 has been shown with reference to coil windings of flat rectangular or square configuration, other even sided polygonal configurations, such as for example hexagonal, may also be used.

The first turn 87 of a single phase coil winding of square configuration is shown in dotted outline in FIG. 8. For providing multiple phases such as a three phase coil winding of flat square configuration phases, additional sets of even number slots 85 and 86 may be formed equally spaced around the periphery of the disk 82, and multiple phases wound, for example in the manner described with reference to FIG. 5.

The principle of operation of the coil structures of the present invention is illustrated and described with reference to FIGS. 9–14. The phases of each of the flat winding structures are selected and arranged to provide a desired pattern or geometry of equivalent current loops at the apexes of the polygonal structures. Generally, at least three phases are incorporated into the coil winding structure and at a particular switching stage or commutation two of the phases are excited to induce current loops and accompanying magnetic field poles at specified locations on the periphery of the coil structure. The coil structure of three or more phases with excitation of only two of the phases at a time provides asymmetry in the poles of the stator for urging rotation of the rotor as the current loops and corresponding magnetic field poles progress around the periphery of the coil structure with successive switching or commutation stages.

Figure 9:
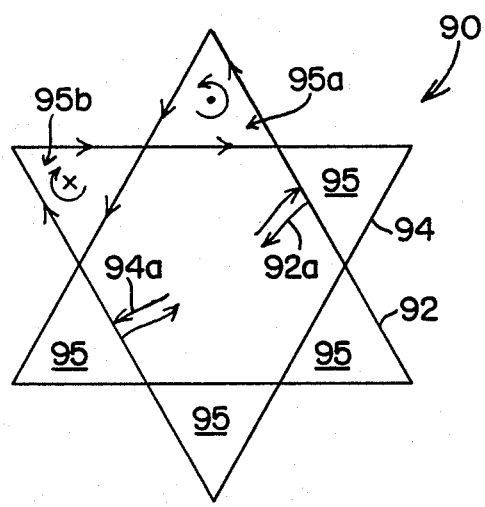
FIG. 9 is a diagrammatic plan view of a two phase coil winding structure with phases of triangular geometry showing the equivalent current loops.

For simplicity, a two phase coil winding structure 90, according to the invention, is illustrated in FIG. 9 including first and second phases 92 and 94 in the configuration of equilateral triangles oriented with a rotational offset of 60°. The two triangular phases 92 and 94 provide six equivalent current loops 95 around the periphery of the resulting polygon. Each of the phases 92 and 94 represent multiple turns of the coil winding wire in flat configuration as heretofore described with respective leads 92a and 94a coupled to appropriate switching or commutation electronics.

When the phases 92 and 94 are energized or electrically excited with current flow in the direction of the arrows on FIG. 9, the equivalent current loop 95a is energized with current flowing in the counterclockwise direction. This produces a magnetic polar orientation with magnetic lines of force exiting the paper from the center of the current loop and entering the paper around the outside of the current loop. Thus, in the commutation stage illustrated in FIG. 9 a north pole appears above the equivalent current loop 95a. On the other hand, equivalent current loop 95b is characterized by a clockwise current flow and magnetic field lines entering the paper through the center of the equivalent current loop and exiting around the outside. As a result, in the commutation or switching stage illustrated in FIG. 9 a south pole appears above the equivalent current loop 95b. Other excited current loops and corresponding magnetic poles are distributed symmetrically around the coil structure. The poles are switched by switching the direction of current flow in phases 92 and 94 in the next switching or commutation stage.

Because of the symmetry of the equivalent current loops and poles distributed around the periphery of the coil structure polygon of FIG. 9, a rotor with a different number of poles may be selected for asymmetry relative to the stator coil structure 90. Continuous rotary motion is therefore achieved by switching the direction of current flow in the phases 92 and 94 at a specified frequency.

Figure 10:
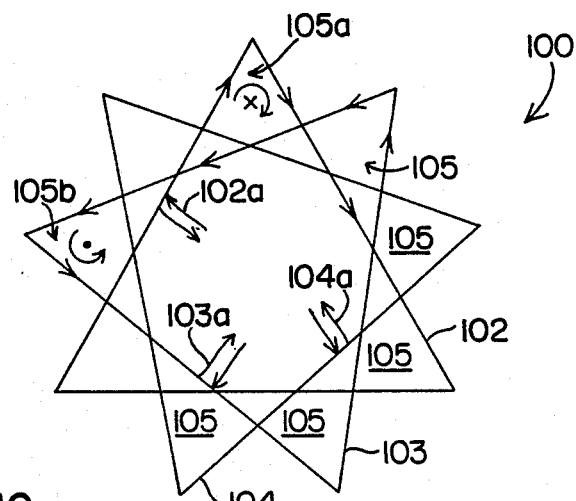
FIG. 10 is a diagrammatic plan view of a three phase coil structure with phases in the configuration of equilateral triangles showing the equivalent current loops.

In the three phase coil structure 100 illustrated in FIG. 10 the three phases 102, 103, and 104 are also of triangular configuration rotationally offset 40° relative to each other. The three phases result in nine equivalent current loop structures 105 distributed around the periphery of the coil structure polygon.

In this example only two of the three phases are energized in a particular switching or commutation stage, for example, phases 102 and 103. Each of the phases 102, 103, and 104 illustrated in FIG. 10 represents multiple turns of coil winding wire in flat configuration as heretofore described provided with respective leads 102a, 103a, and 104a coupled to appropriate switching or commutation electronics. With phases 102 and 103 excited with electric current in the direction of the arrows illustrated in FIG. 10 equivalent current loop 105a is energized with electric current flowing in the clockwise direction producing magnetic field lines entering the paper through the center of the equivalent current loop and exiting the paper around the outside with a south magnetic pole above current loop 105a. On the other hand, equivalent current loop 105b is excited with electric current flowing in the counterclockwise direction producing magnetic field lines exiting the paper through the center of the equivalent current loop and entering the paper around the outside with a north magnetic pole above current loop 105b. Other excited current loops and corresponding magnetic poles are distributed asymmetrically around the periphery of the coil structure.

For rotation of the magnetic field poles around the periphery of the coil structure polygon 100 different combinations of two of the three phases 102, 103 and 104 are energized in successive switching or commutation stages at selected levels and directions to achieve the desired pattern of motion. The switching or commutation is achieved according to well known methods for timed or programmed commutation or commutation based upon sensed position of the rotor. For moving coil structure rotors, brushes and slip rings are provided for current flow into and out of the selected phases of the coil structure.

By exciting only two of the three phases an asymmetrical polar configuration is created around the periphery of the coil structure polygon 100 urging a rotor with a selected number of poles to rotation. In subsequent stages of switching or commutation the equivalent current loops and corresponding magnetic field poles rotate or progress around the periphery of the coil winding structure producing the desired uniform or incremental motion of the rotor.

Figure 11:
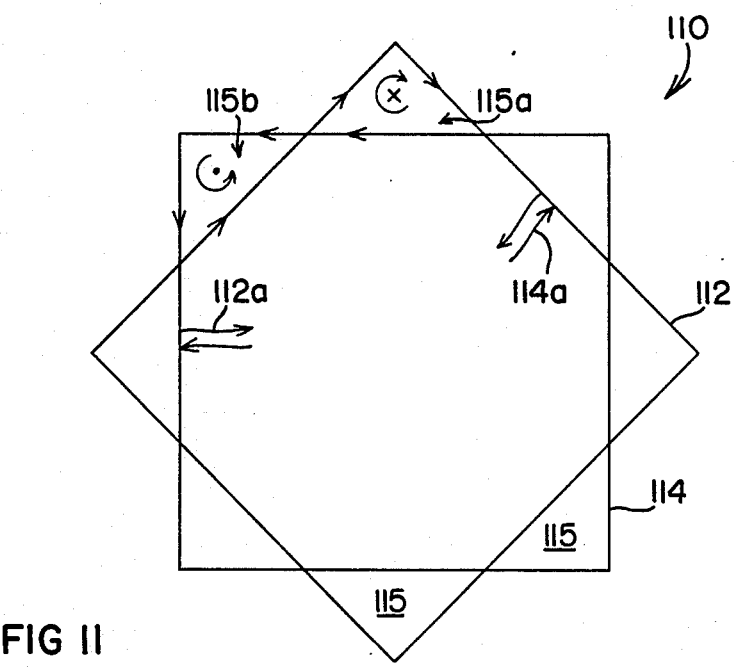
FIG. 11 is a diagrammatic plan view of a two phase coil structure with phases of square geometrical configuration showing the equivalent current loops.
Figure 12:
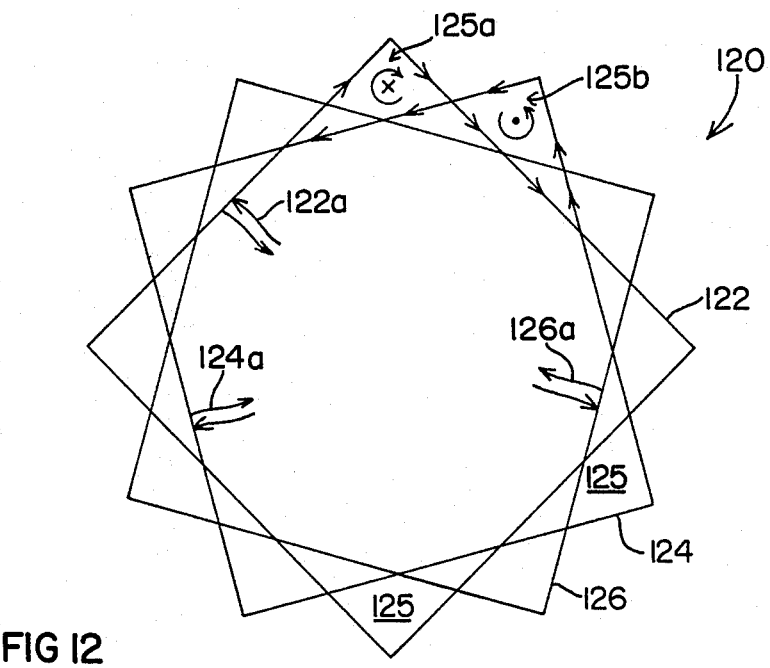
FIG. 12 is a diagrammatic plan view of a three phase coil structure with phases of square configuration.

While coil winding structures of multiple phases with each phase a triangle or other odd numbered apex polygon constitutes the preferred geometrical configuration, phases of even number apex polygons such as squares may also be used, for example, as illustrated in FIGS. 11 and 12. In FIG. 11 a simplified two phase coil structure 110 is illustrated with phases 112 and 114 of square geometrical configuration. Each phase 112 and 114 represents multiple turns of coil winding wire in flat configuration as heretofore described with respective leads 112a and 114a coupled to appropriate switching or commutation electronics. The overlapping perimeters of the phases of coil structure 110 in FIG. 11 produce a ring of eight equivalent current loops 115 around the apexes of the polygon structure. With the phases 112 and 114 energized by electric current in the direction of the arrows illustrated in FIG. 11 equivalent current loop 115a for example is excited by current flow in the clockwise direction producing magnetic field lines entering the paper inside the equivalent current loop and producing a south pole above the current loop 115a. On the other hand, equivalent loop 115b is excited by current flowing in the counterclockwise direction, producing magnetic field lines exiting the paper through the center of the equivalent current loop and producing a north pole over equivalent current loop 115b. A rotor with an odd number of poles is then urged to rotation by commutation of the phases and alternation of the equivalent current loops and poles in a symmetrical array around the periphery of the coil structure.

A three phase coil winding 120 composed of phases 122, 124, and 126 of square geometry is illustrated in FIG. 12. The overlapping perimeters result in twelve equivalent current loop structures 125 distributed around the periphery at the apexes of the coil structure polygon 120. Each of the phases 122, 124 and 126 represents multiple turns of current winding wire in flat configuration as heretofore described with respective leads 122a, 124a, and 126a coupled to appropriate switching or commutation electronics.

Only two of the phases are energized by electric current at any particular switching or commutation stage to provide asymmetry in the poles distributed around the periphery of the coil structure polygon for rotation of poles 360° around the perimeter by selected commutation. With phases 122 and 124 energized by electric current in the direction of the arrows shown in FIG. 12, the equivalent current loops 125a, for example, is excited by a clockwise electric current resulting in magnetic field lines entering the paper through the center of the equivalent current loop and a magnetic south pole centered above the equivalent current loop 125a. On the other hand, equivalent current loop 125b is excited by electric current in the counterclockwise direction producing magnetic field lines exiting the paper through the center of the equivalent current loop and producing a magnetic north pole over the equivalent current loop 125b. Upon commutation a rotor of the desired number of poles is urged to rotation for smooth or incremental motion as specified.

Figure 13:
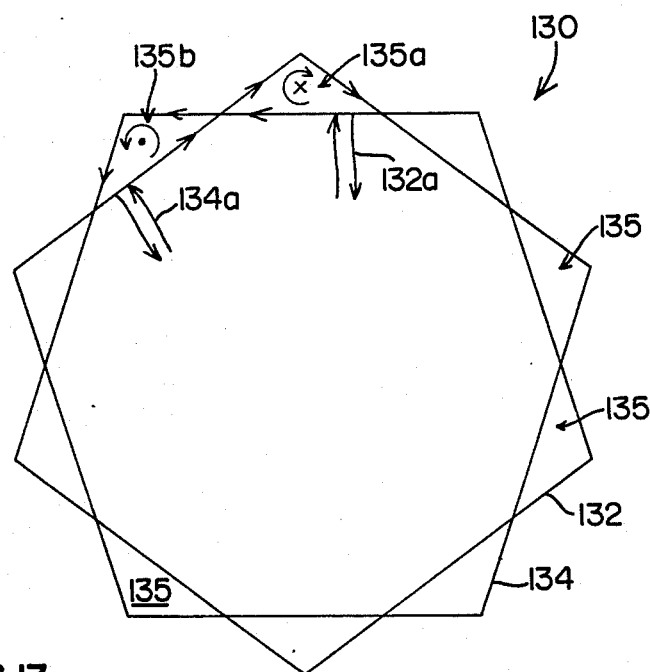
FIG. 13 is a diagrammatic plan view of a two phase coil structure with phases of pentagonal geometry showing the equivalent current loops of lesser radial depth.
Figure 14:
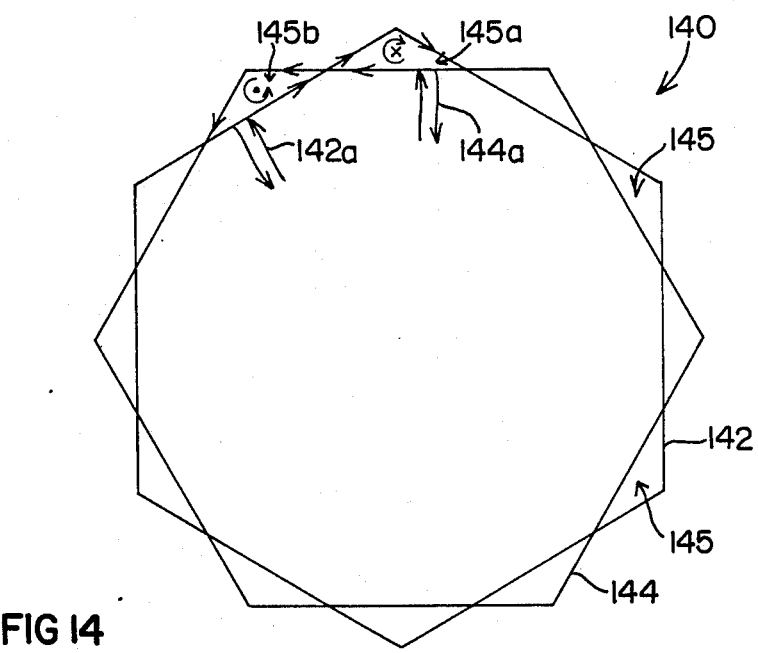
FIG. 14 is a diagrammatic plan view of a two phase coil structure with phases of hexagonal geometry showing even shallower equivalent current loops.

As the geometrical configuration of the respective phases of the coil winding structure increases in the number of apexes and sides, for example to pentagons and hexagons as illustrated in FIGS. 13 and 14, the radial depth of the equivalent current loop structures around the periphery of the coil structure polygon decreases and therefore the effectiveness and strength of the axially directed magnetic fields also decreases. In the limit of phases of circular configuration of course the equivalent current loops vanish and along with them the axial magnetic fields distributed around the periphery of the coil winding structure. Thus, as the currents in the phases approach circumferential currents the effectiveness of the equivalent current loops diminishes. On the other hand, the closer the current flows in the respective phases approach radial components of current flow, the greater the effectiveness of the current loops and strength of the axial magentic fields distributed around the periphery of the coil structure.

It is therefore the preferred form and best mode of the present invention to use in the coil winding structures multiple phases in which the phases are of equilateral triangle or square configuration as illustrated in FIGS.

9-11. Particularly in the phases of triangular configuration, the equivalent current loops are maximized along with the axial magnetic fields which they produce distributed around the periphery of the coil structure. The pentagonal and hexagonal geometrical configuration phases used in the multiphase coil structures of FIGS. 13 and 14 effectively represent limiting though functional and operative configurations according to the invention for rotor and stator applications. In these configurations the radial depth of the current loops is diminished though sufficient for operative use in rotors and stators.

A coil winding structure 130 with pentagonal configuration phases is illustrated in FIG. 13 and for simplicity a structure with only two phases 132 and 134 is illustrated. Each of the pentagon geometry phases 132 and 134 represents multiple turns of coil winding wire in flat configuration as heretofore described with respective leads 132a and 134a coupled to appropriate electrical switching or commutation circuitry not shown. The overlapping perimeters of the pentagons 132 and 134 result in the equivalent current loop structures 135 distributed around the perimeter at the apexes of the coil structure polygon 130. The equivalent current loops 135 are of decreasing radial depth in comparison to those illustrated in FIGS. 9-12. With phases 132 and 134 energized with electric currents in the direction of the arrows in FIG. 13, equivalent current loop 135a is excited with a clockwise current producing a south pole above current loop 135a while current loop 135b is excited with a counterclockwise current producing a north magnetic pole above equivalent current loop 135b. Other excited current loops and corresponding magnetic poles are distributed around the coil structure.

In FIG. 14 the coil winding structure 140 is composed of phases of hexagonal configuration with only two phases 142 and 144 shown for simplicity. Each of the hexagon configuration phases 142 and 144 represents multiple turns of coil winding wire in flat configuration as heretofore described with respective leads 142a and 144a coupled to appropriate switching or commutation electronics not shown. With phases 142 and 144 energized with electric current in the direction of the arrows shown in FIG. 14 equivalent current loop 145a, for example, is excited with electric current in the clockwise direction producing a magnetic south pole over equivalent circuit loop 145a while equivalent circuit loop 145b is excited with electric current in the counterclockwise direction producing a north pole over equivalent current loop 145b. It is apparent that the equivalent current loop structures 145 produced by the overlapping perimeters of hexagons 142 and 144 are of even shallower radial depth than the equivalent loop structures 135 produced by the overlapping pentagons 132 and 134, though still operative.

A feature and advantage of the flat bobbin coil form of either annular, solid, spoked or cutout configuration and the winding method according to the invention is that the winding and assembly of coil windings of flat polygonal configuration according to the invention may be readily automated by well known coil winding methods and apparatus for automatic winding and assembly of the coil winding structures. Furthermore, while the invention has been described with reference to particular application in dc motors, it is also applicable for meters, torquers and sensors. Thus, the invention has been described with reference to particular example embodiments but is intended to cover all variations and equivalents within the scope of the following claims.

I claim:

1. A coil form or bobbin for winding coil winding wire to form a flat winding comprising:

a flat disk formed with a plurality of peripheral radial slots comprising at least one set of n slots spaced around the periphery of the flat disk dividing the bobbin into a respective set of n segments, said slots extending from the outside perimeter radially part way into the flat annular disk, said slots having a width greater than one diameter and not substantially greater than two diameters of the coil winding wire, said n slots and n segments all lying in a single common plane;

said n number of slots being selected in number so that turns of coil winding wire form well defined apexes at the slots of the set of n slots with well defined angles, said turns of coil winding wire forming conducting paths on either side of the apexes having components of radial direction in the direction of radii of the bobbin for conducting radial components of current flow on either side of the apexes.

2. The coil form or bobbin of claim 1 wherein the plurality of peripheral radial slots comprises a plurality of sets of n slots dividing the bobbin into a respective plurality of sets of n segments, said plurality of sets of n slots being offset in angular phase relative to each other around the bobbin, said plurality of sets of n slots and segments all lying in a single common plane.

3. The coil form or bobbin of claim 2 wherein n is an odd integer.

4. The coil form or bobbin of claim 3 where n equals 3.

5. The coil form or bobbin of claim 2 wherein the bobbin comprises thermoplastic material so that the bobbin may be melted away after a winding is formed on the bobbin.

6. The coil form or bobbin of claim 2 wherein the flat disk comprises a flat annular disk.

7. The coil form or bobbin of claim 2 wherein the bobbin comprises a moldable material so that a winding formed on the bobbin may be pressed into the bobbin material.

8. A winding of coil winding wire in flat configuration for rotor and stator applications comprising:

a first winding phase comprising multiple turns of coil winding wire in a flat array of two layers of coil winding wire lying in two parallel adjacent slightly spaced apart planes, said multiple turns of coil winding wire arranged in the configuration of a flat substantially regular polygon having well defined apexes, said multiple turns of coil winding wire turning in the same direction for conducting electrical current in the same rotational direction around the first phase, said multiple turns of coil winding wire lying substantially next to each other side-by-side in the respective layers of said flat array in the radial directions of the polygon along the sides of the polygon, said turns of coil winding wire lying in alternately opposite planes of the two parallel adjacent planes between successive apexes crossing over between said two parallel adjacent planes at the apexes of the polygon, said multiple turns of coil winding wire being formed with well defined similar, radially aligned angles stacked one outside the other at each of the apexes or nodes of the polygon, said turns of coil winding wire forming conducting paths on either side of the apexes having components of radial direction in the direction of radii of the flat coil winding for conducting radial components of current flow on either side of the apexes, said radial components of current flow defining axially directed magnetic fields at the apexes parallel to the center axis of the flat coil winding.

9. The winding of claim 8 further comprising a plurality of winding phases, each winding phase constructed and arranged according to the winding phase of claim 8, each winding phase comprising a similar flat substantially regular polygon rotationally offset in angular phase relative to the other winding phases thereby providing a flat multipole multiphase winding.

10. The winding of claim 9 wherein the polygon comprises a flat substantially equilateral triangle.

11. A winding of coil winding wire in flat configuration for rotor and stator applications comprising:
a first winding phase comprising multiple turns of coil winding wire in a flat array of two overlying layers of coil winding wire lying in two parallel adjacent planes slightly spaced apart;
said multiple turns of coil winding wire arranged in the configuration of a flat substantially regular polygon with the two layers overlaying each other in said two parallel adjacent planes along the flat faces of the polygon, said polygon comprising an odd number of side segments and an odd number of well defined apexes or nodes;
said multiple turns of coil winding wire of both the odd number turns and even number turns turning in the same direction for conducting electrical current in the same rotational direction around the first phase;
said turns of coil winding wire lying substantially next to each other side-by-side in the respective layers of said flat array in the radial directions of the polygon;
said multiple turns of coil winding wire lying between apexes in alternately opposite layers between successive apexes, crossing over between said two layers at the apexes;
said multiple turns of coil winding wire being formed with well defined similar radially aligned angles stacked one outside the other at each of the apexes or nodes of the polygon, the coil winding wire of the consecutive odd number turns crossing the coil winding wire of the consecutive even number turns in opposite directions at each of the apexes or nodes of the polygon thereby alternating between the overlaying and underlying positions along successive segments of the polygon;
said turns of coil winding wire formed conducting paths on either side of the apexes having components of radial direction in the direction of radii of the flat coil winding for conducting radial components of current flow on either side of the apexes, said radial components of current flow defining axially directed magnetic fields at the apexes parallel to the center axis of the flat coil winding;
said first and second layers thereby forming a first multiple winding phase.

12. The winding of claim 11 further comprising a plurality of winding phases, each winding phase constructed and arranged according to the first winding phase of claim 11, each winding phase comprising a similar flat substantially regular polygon rotationally offset in angular phase relative to the other winding phases thereby providing a flat multipole multiphase winding, each winding phase being formed with separate electrical leads for separately switching electrical current through the winding phase, said plurality of winding phases defining equivalent current loops at the apexes around the periphery of the flat coil winding for defining axially directed magnetic fields of alternately opposite polarity around the periphery of the flat coil winding.

13. The winding of claim 11 wherein the polygon comprises a flat triangle.

14. The winding of claim 11 wherein the first winding phase is wound in the configuration of a flat equilateral triangle and the turns of coil winding wire form acute angles at the apexes.

15. The winding of claim 11 wherein the first winding phase is wound in the configuration of a flat pentagon and the turns of coil winding wire form obtuse angles at the apexes.

16. A coil form or bobbin and winding of coil winding wire comprising:
a flat disk formed with a plurality of peripheral radial slots comprising at least one set of n slots spaced around the periphery of the flat disk dividing the bobbin into a respective set of n segments, said slots extending from the outside perimeter radially part way into the flat annular disk, said slots having a width greater than one diameter and not substantially greater than two diameters of the coil winding wire, said n slots and n segments all lying in a single common plane;
said n number of slots being selected in number so that turns of coil winding wire wound alternately back and forth through successive slots around the periphery of the flat disk form well defined apexes at the slots of the set of n slots with well defined angles, said turns of coil winding wire thereby forming conducting paths on either side of the apexes having components of radial direction in the direction or radii of the flat disk for conducting radial components of current flow on either side of the apexes;
a first winding phase comprising multiple turns of coil winding wire wound alternately back and forth through successive slots around the periphery of the flat disk in a flat array forming two layers of coil winding wire lying in two parallel adjacent planes on opposite sides of the flat disk slightly spaced apart by the thickness of the flat disk, said multiple turns of coil winding wire arranged in the configuration of a flat substantially regular polygon having well defined apexes, said multiple turns of coil winding wire turning in the same direction for conducting electrical current in the same rotational direction around the first phase, said multiple turns of coil winding wire lying substantially next to each other side-by-side in the radial directions of the polygon in the respective layers of said flat array along the sides of the flat disk, said turns of coil winding wire lying between apexes in alternately opposite planes of the two parallel adjacent planes on opposite sides of the flat disk crossing over between said two parallel adjacent planes at the apexes of the polygon, said multiple turns of coil winding wire being formed with well defined similar, radially aligned angles stacked one outside the other at each of the apexes or nodes of the polygon located at the slots of the flat disk, said turns of coil winding wire forming conducting paths on either side of the apexes having components of radial direction in the direction of radii of the flat coil winding for conducting radial components of current flow on either side of the apexes, said radial components of current flow defining axially directed magnetic fields at the apexes parallel to the center axis of the flat coil winding and flat disk.

17. The coil form or bobbin and winding of claim 16 wherein the plurality of peripheral radial slots, of the flat disk comprises a plurality of sets of n slots dividing the bobbin into a respective plurality of sets of n segments, said plurality of sets of n slots being offset in angular phase relative to each other around the flat disk, said plurality of sets of n slots and n segments all lying in a single common plane and further comprising a plurality of winding phases, each winding phase constructed and arranged according to the winding phase of claim 16, each winding phase comprising a similar flat substantially regular polygon rotationally offset in angular phase relative to the other winding phases, said winding phases coinciding with the phases of the sets of n slots of the flat disk thereby providing a flat multipole multiphase winding.

18. The coil form of bobbin and winding of claim 16 wherein n is an odd integer and the polygon comprises a flat substantially equilateral triangle.

* * * * *